United States Patent
Sivakumar

(10) Patent No.: US 7,310,530 B2
(45) Date of Patent: Dec. 18, 2007

(54) DATA TRANSMISSION TO A FIRST NODE FROM A SECOND NODE TO ANOTHER SECOND NODE

(75) Inventor: Tatikonda Venkata Lakshmi Nasarinha Sivakumar, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/498,106

(22) PCT Filed: Dec. 7, 2001

(86) PCT No.: PCT/IB01/02781

§ 371 (c)(1),
(2), (4) Date: Jun. 7, 2004

(87) PCT Pub. No.: WO03/049382

PCT Pub. Date: Jun. 12, 2003

(65) Prior Publication Data

US 2005/0043029 A1    Feb. 24, 2005

(51) Int. Cl.
*H04Q 7/00*      (2006.01)
*H04L 12/26*    (2006.01)
*H04J 3/16*      (2006.01)

(52) U.S. Cl. .............. 455/445; 455/450; 455/507; 455/509; 370/236; 370/346; 370/337; 370/345; 370/349

(58) Field of Classification Search ............ 455/542.1, 455/450, 451, 445, 452.1, 452.2, 41.2, 500, 455/507, 509, 112, 422.1, 511–515; 370/338, 370/236, 337, 345–349, 328, 329
See application file for complete search history.

(56) References Cited

U.S. PATENT DOCUMENTS 5,436,905 A * 7/1995 Li et al. ............... 370/346
6,751,200 B1 * 6/2004 Larsson et al. ........... 370/255

(Continued)

FOREIGN PATENT DOCUMENTS

WO   WO 01/11830 A1   2/2001

(Continued)

OTHER PUBLICATIONS

Zhang et al, "On Improving the Performance of Bluetooth Networks Through Dynamic Role Management", Technical Report, May 2001, XP002198269, pp. 1-16.

*Primary Examiner*—Lester Kincaid
*Assistant Examiner*—Emem Ekong
(74) *Attorney, Agent, or Firm*—Squire Sanders & Dempsey L.L.P.

(57) ABSTRACT

A method for transmitting data in a data transmission system comprising a first node and a plurality of second nodes, the first node being arranged to address the second nodes in a predetermined order, and each second node being arranged to transmit data to the first node immediately after having been addressed by the first node; the method comprising: if a second node has data to transmit to the first node and another second node in the order did not transmit data to the master in its previous opportunity to do so, forwarding at least some of the data from the said second node to the said other second node for transmission to the master via the said other second node.

13 Claims, 4 Drawing Sheets

U.S. PATENT DOCUMENTS

| | | |
|---|---|---|
| 6,775,258 B1 * | 8/2004 | van Valkenburg et al. .. 370/338 |
| 6,823,186 B2 * | 11/2004 | Salokannel et al. ...... 455/452.1 |
| 2002/0034172 A1 * | 3/2002 | Ho .............................. 370/338 |
| 2002/0193073 A1 * | 12/2002 | Fujioka ....................... 455/41 |
| 2003/0058826 A1 * | 3/2003 | Shearer, III ................. 370/338 |
| 2004/0014464 A1 * | 1/2004 | Takatori et al. .......... 455/422.1 |
| 2005/0276255 A1 * | 12/2005 | Aiello et al. ................ 370/348 |

FOREIGN PATENT DOCUMENTS

| | | |
|---|---|---|
| WO | WO 01/69861 A2 | 9/2001 |

* cited by examiner

Round robin polling by master

Channel utilization using pure round robin polling

Channel utilization using our proposed method

Channel utilization using proposed algorithm with restrictive assumption

DATA TRANSMISSION TO A FIRST NODE FROM A SECOND NODE TO ANOTHER SECOND NODE

This invention relates to methods for transmitting data, for instance in wireless telecommunications systems, and systems for transmitting data.

One scheme for organising nodes in a data transmission system is known as the master-slave scheme. This is illustrated in FIG. 1. A number of slave units 1 can communicate with a master unit 2. In this example the slaves and the master together form a piconet. The master unit may have a data link 3 to further nodes shown generally as network 4. The slave units can communicate with network 4 via the master unit. In some systems the slave units can also communicate directly with each other. One means of implementing such a scheme is by using the Bluetooth communication protocol.

In some such systems only one of the slaves can communicate with the master at any one time. To illustrate this, there may be considered to be a single channel for the slaves to communicate with the master; that channel being shared between the slaves. FIG. 2 is a timing diagram illustrating one example of this arrangement in a Bluetooth system. FIG. 2 shows two channels: a downlink channel 10 for communication from the master to the slaves and an uplink channel 11 for communication from the slaves to the master. The channels are split into slots having a duration of 625 μs. In this example the uplink and downlink slots are not used simultaneously so the uplink and downlink channels could even be the same. In this example there are seven slaves.

In a Bluetooth system a slave can send data to the master on the uplink channel only if the slave was addressed by the master in the previous slot on the downlink channel. Each slave needs to be able to send data to the master from time to time and can not do so until it has been addressed by the master. However, the master does not know when a slave has data to send, so it cannot know when to address which of the slaves to achieve optimum efficiency. To overcome this difficulty, the master is normally arranged to address each of the slaves in turn, giving them an opportunity to send data on the uplink on a round-robin basis. This is illustrated in FIG. 2. The master polls each of the slaves in turn by packets, which are addressed to slaves 1, 2, 3, 4, 5, 6, 7 and 1 in turn. Those slaves that have data to send to the master do so in response to the packets that address them, by packets from slaves 1, 2, 3, 7 and 1 in turn.

The round-robin algorithm has the advantage that it is easy to organise. However, it has the disadvantage that the uplink channel can only be 100% utilised when all the slaves have data to send to the master.

The impact of a round-robin algorithm on channel utilisation is illustrated in FIG. 3. FIG. 3 assumes that each slave is allocated its own physical uplink channel for transmitting data to the master and its own physical downlink channel for receiving data from the master. These physical channels may be distinguished by frequency, for instance. In the system shown in FIG. 3 a slave n has a downlink channel 2n-1 and an uplink channel 2n allocated to it. FIG. 3 shows an example of the usage of frequencies 1 to 14 during time slots T1 to T16.

Other algorithms have been proposed with the aim of increasing utilisation of the uplink channel. These systems involve the master favouring some slaves over others. For example, the master may send more addressing packets to slaves that sent data when they last had an opportunity. These systems can improve channel utilisation. However, if the master is to favour one of the slaves, the other slaves must be given less opportunity to transmit data than under the round-robin system. Therefore, although these algorithms can improve channel utilisation they can increase latency for slaves that transmit data sporadically.

In some systems the slaves can-communicate directly between each other. A slave can send data to another slave by transmitting on its uplink channel data that is addressed to the other slave.

There is a need for a system that allows channel utilisation to be increased whilst maintaining relatively low latency.

According to one aspect of the present invention there is provided a method for transmitting data in a data transmission system comprising a first node and a plurality of second nodes, the first node being arranged to address the second nodes in a predetermined order, and each second node being arranged to transmit data to the first node immediately after having been addressed by the first node; the method comprising: if a second node has data to transmit to the first node and another second node in the order did not transmit data to the master in its previous opportunity to do so, forwarding at least some of the data from the said second node to the said other second node for transmission to the master via the said other second node.

Preferably, if a second node has data of its own to transmit to the master then it does so in preference to transmitting to the master data that it has received from another second node.

Preferably, if a second node has forwarded its own data to another second node for transmission to the master it monitors transmissions to the master to determine whether that data is transmitted to the master.

Preferably, if a second node has forwarded data to another second node for transmission to the first node it monitors transmissions to the master to determine whether that data is transmitted to the master.

Preferably, if the said data has not been transmitted to the first node before the said second node next has an opportunity to transmit data to the first node it transmits the said data to the first node.

Preferably, each second node is arranged to transmit a single packet of data to the first node immediately after having been addressed by the first node.

Preferably each packet of data comprises an identification of the node that transmitted it.

Preferably each packet of data comprises an identification of the node to which it is transmitted.

Preferably the first and second nodes are operable according to the Bluetooth protocol.

Preferably the first and second node communicate with each other by wireless means.

The present invention will now be described by way of example with reference to the drawings.

An embodiment of the present invention is applicable in a system comprising a master unit and a plurality of slave units. The slave units can communicate with each other, and with the master unit. The slaves are addressed in turn by the master. A slave may transmit to the master only during the slot immediately after it has been addressed by the master. The master addresses the slaves on a round-robin basis. With the aim of increasing the channel usage a slave that has data to transmit to the master can do so by transmitting it to the master during the slot available to that slave, or by transmitting the data to another slave, so that the latter slave can transmit it to the master during the slot available to it.

Figure 1:
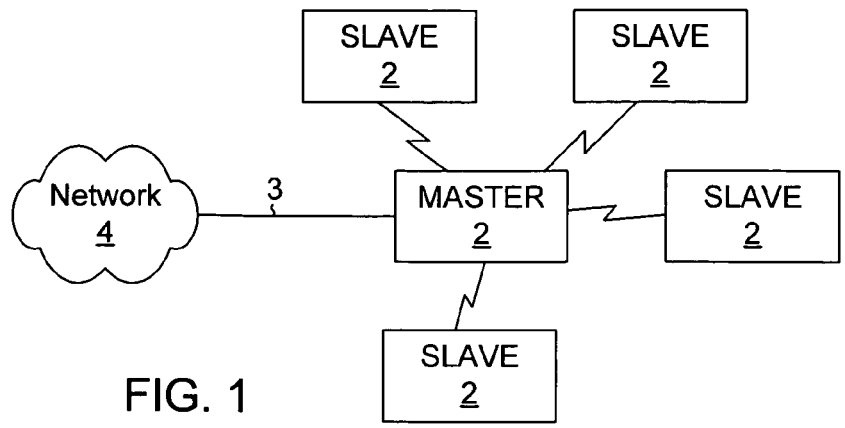
FIG. 1 is a schematic diagram of a data transmission system.
Figure 2:
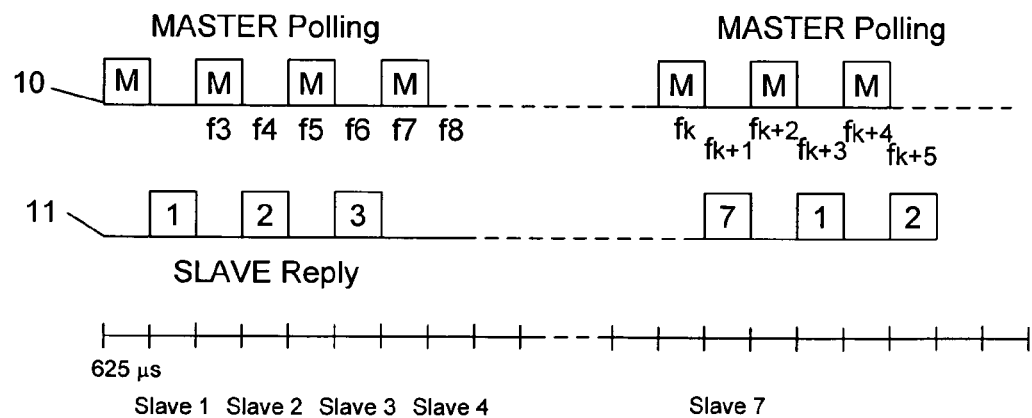
FIG. 2 is a timing diagram illustrating uplink and downlink packets under a round-robin scheme.
Figure 4:
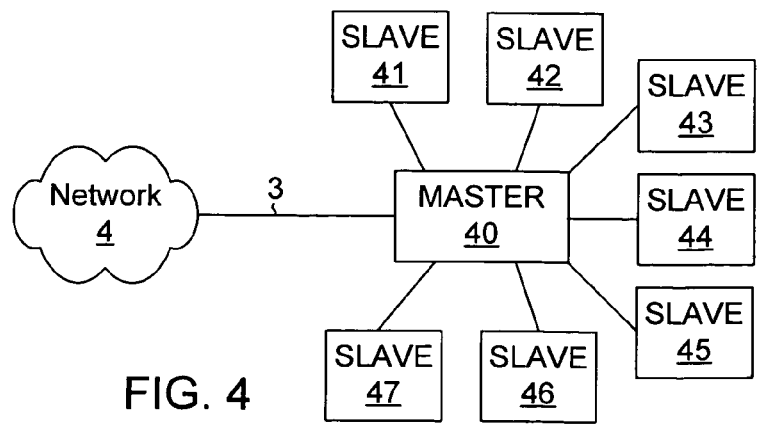
FIG. 4 is a schematic diagram of a data transmission system.

The present invention may be applied to a network generally of the type shown in FIG. 4. This includes a master 40 and slaves 41-47. Each slave has a physical transmit channel on which it can transmit data and a physical downlink channel on which it can receive data from the master. These physical channels are distinguished by frequency, for instance. In the system shown in FIG. 4 a slave n has a transmit channel 2n-1 and an downlink channel 2n allocated to it. As in FIG. 1, the master can transmit via link 3 with a network 4 containing other nodes.

The master and each slave in the system of FIG. 4 has an identity code such as an active member address (AMA) assigned to it.

Data on the channels is transmitted in chunks (e.g. packets), one of which can be sent during each slot. Each chunk includes a header that includes the AMA of the master/slave that transmitted the packet, and the AMA of the master/slave that is to receive the packet.

Each slave listens on the transmit frequencies of the other slaves. If a slave detects a packet that indicates its own AMA as the recipient then it receives the packet. In this way each slave can communicate directly with any of the other slaves, without sending data via the master.

Each slave is also aware of the order in which the master polls the slaves. In this example the slaves are polled one-by-one in numeric order, but there are other possibilities.

In the present system, the slaves can transmit data directly to the master. Also, they can transmit data indirectly to the master by sending it via a slave that would otherwise be idle. Thus a distinction can be made between two types of data that the slaves can send to the master:

a. a slave's "own data"—that is data for direct transmission to the master; and b. "indirect data"—that is data received from another slave for indirect transmission to the master.

The slaves implement the following additional algorithm for transmitting data to the master:

1. If any slave has any own data to send to the master then it does so in preference to sending any indirect data to the master. If a slave has not own data but does have indirect data to send then it sends the indirect data. Any sending to the master is always done in the slot immediately following being addressed by the master.

2. Each slave is aware of the order in which the slaves are addressed by the master and monitors whether during the previous slave in the round sent data to the master during the round. If the previous slave did not send data during the previous round then the slave in question forwards the next chunk of data that it has to transmit to that previous slave. This can be done during the transmission slot of any slave. If a slave has forwarded data to another slave then it monitors uplink transmissions to the master to check that its forwarded data is transmitted to the master. If it is not then it transmits the forwarded data to the master itself.

Figure 3:
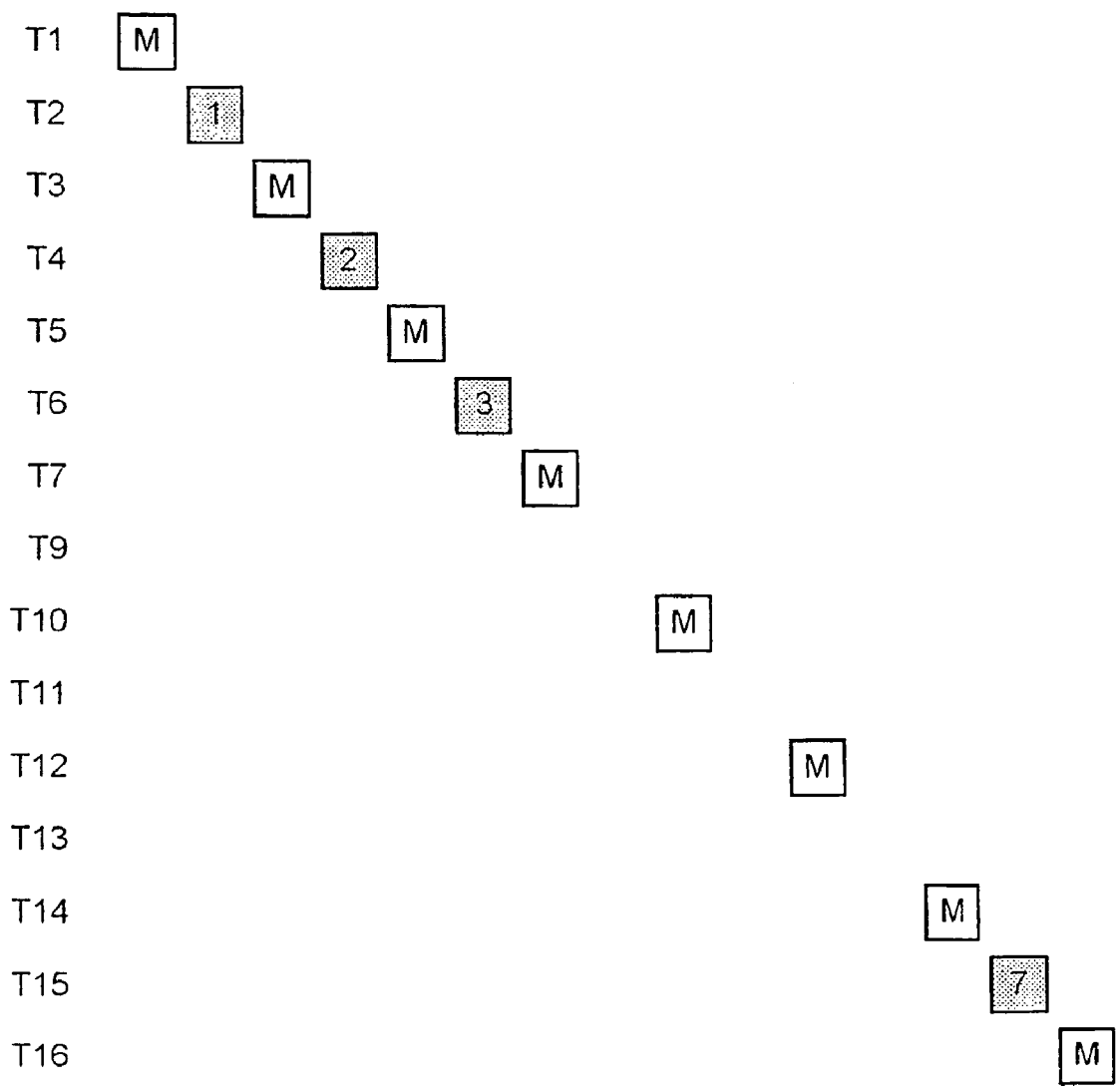
FIG. 3 illustrates channel utilisation under a round-robin scheme.
Figure 5:
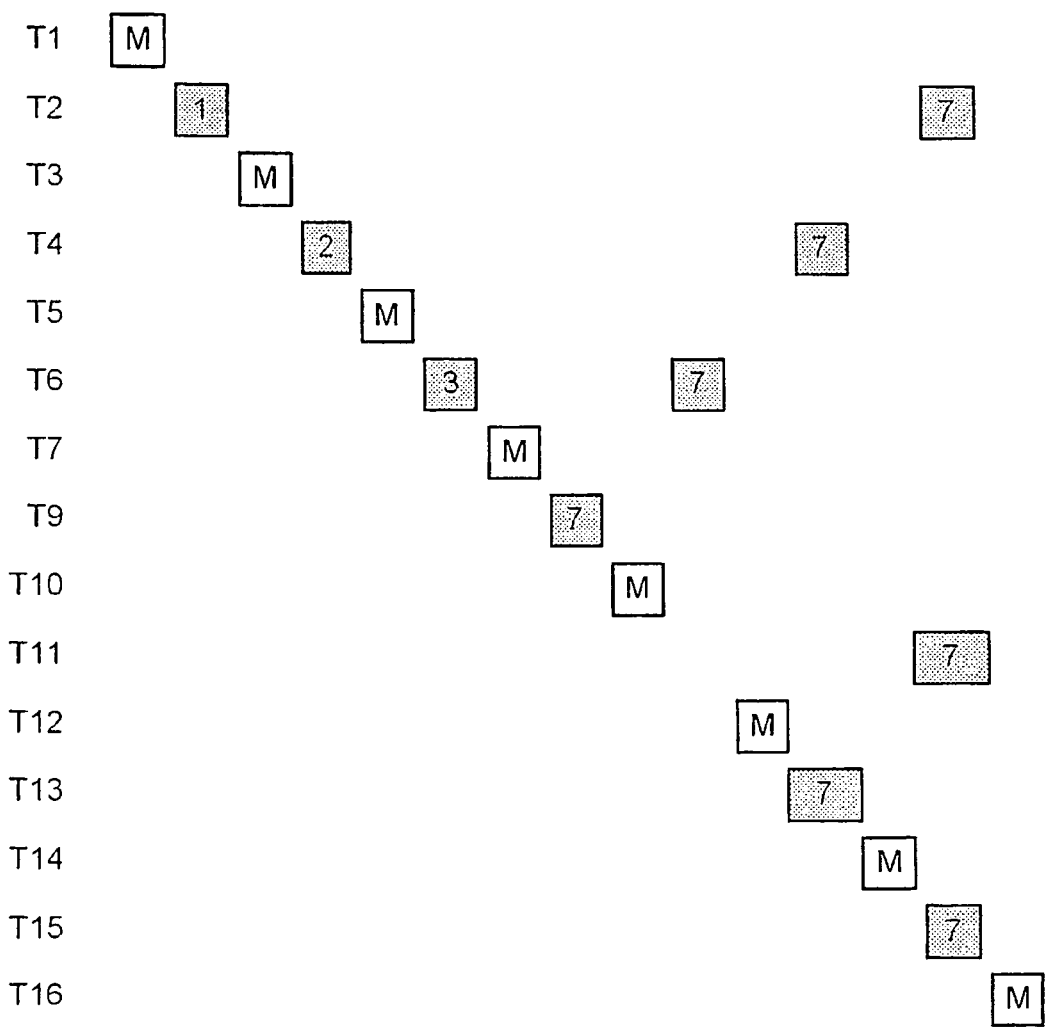
FIGS. 5 and 6 illustrate channel utilisation under improved schemes.

This algorithm is illustrated in FIG. 5. It is assumed that during the previous round of addressing the slaves had behaved as shown in FIG. 3, and that slave 7 has a continuing stream of data to send to the master. Slave 7 notes that during their previous opportunities to transmit slaves 4, 5 and 6 did not transmit. Therefore, in the transmission slot immediately-following its last transmission slave 7 forwards a first chunk of data to slave 6. On receiving the data slave 6, which has noted that slave 5 did not transmit on its previous opportunity, forwards the chunk of data to slave 5. On receiving the data slave 5, which has noted that slave 4 did not transmit on its previous opportunity, forwards the chunk of data to slave 4. Slave 4 is then able to transmit to the master and having no own data to transmit to the master, transmits the chunk of indirect data from slave 7. This is noted by slave 7 which is monitoring uplink transmissions. Then slave 7 can forward a second chunk of data to slave 6, which transmits it to the master. Subsequently, slave 7 transmits a third chunk of data to the master itself. If slave 4 had had its own data to transmit then the first chunk of data would have been dropped by slave 4 instead of being transmitted. In that case slave 7 would have transmitted the first chunk to slave 6 in the second phase of forwarding, and if that failed transmitted it directly to the master itself, instead of the second or third chunk.

The master cannot infer the ultimate source of data it receives on an uplink from knowing the slave that sent the data to it. It should check the header of the data.

In the system illustrated in FIG. 5, the frequency on which a slave K transmits a packet is given by:

$$\text{transmit frequency} = F(I)$$

where I is then number of slots the node K had to wait to get a chance to transmit to the master in a normal scenario. The slave K-1 needs only to listen for inter-slave transmissions on the frequency at which node K would transmit. A special case exists for the node that is currently being polled. In this case I=0. For a node that is next to be polled, I=2. In general, if node K's position in the queue of nodes waiting to be polled is m then I=2m.

It should be noted that any slave can drop an indirect chunk (e.g. packet) under the following circumstances:

1. It has own data to send. (If that is known before the indirect chunk is sent to it then it need not even receive the indirect chunk from its successor).

2. It has not received the indirect chunk. (The indirect chunk may have a checksum to allow correct receipt to be verified).

Therefore, after a slave has sent a chunk of data to a predecessor for indirect transmission it needs to check for transmission of the chunk to the master. It could also monitor the forwarding of the chunk between predecessor slaves. Thus it can tell if the chunk has been dropped by one of the predecessors. The tracking of the chunk can simply be done by monitoring the appropriate transmission frequencies.

In a preferred system, slaves that have forwarded a chunk during the current round store that chunk temporarily and also monitor for its transmission by predecessor nodes. If the forwarding slave has no data to transmit and has noted that the chunk has not been transmitted by a predecessor slave then it transmits the chunk itself when it has an opportunity to do so. This provides further efficiency improvements. For instance, in this system if slave 4 in FIG. 5 had had its own data to send then slave 5 could have sent the forwarded chunk from slave 7.

Figure 6:
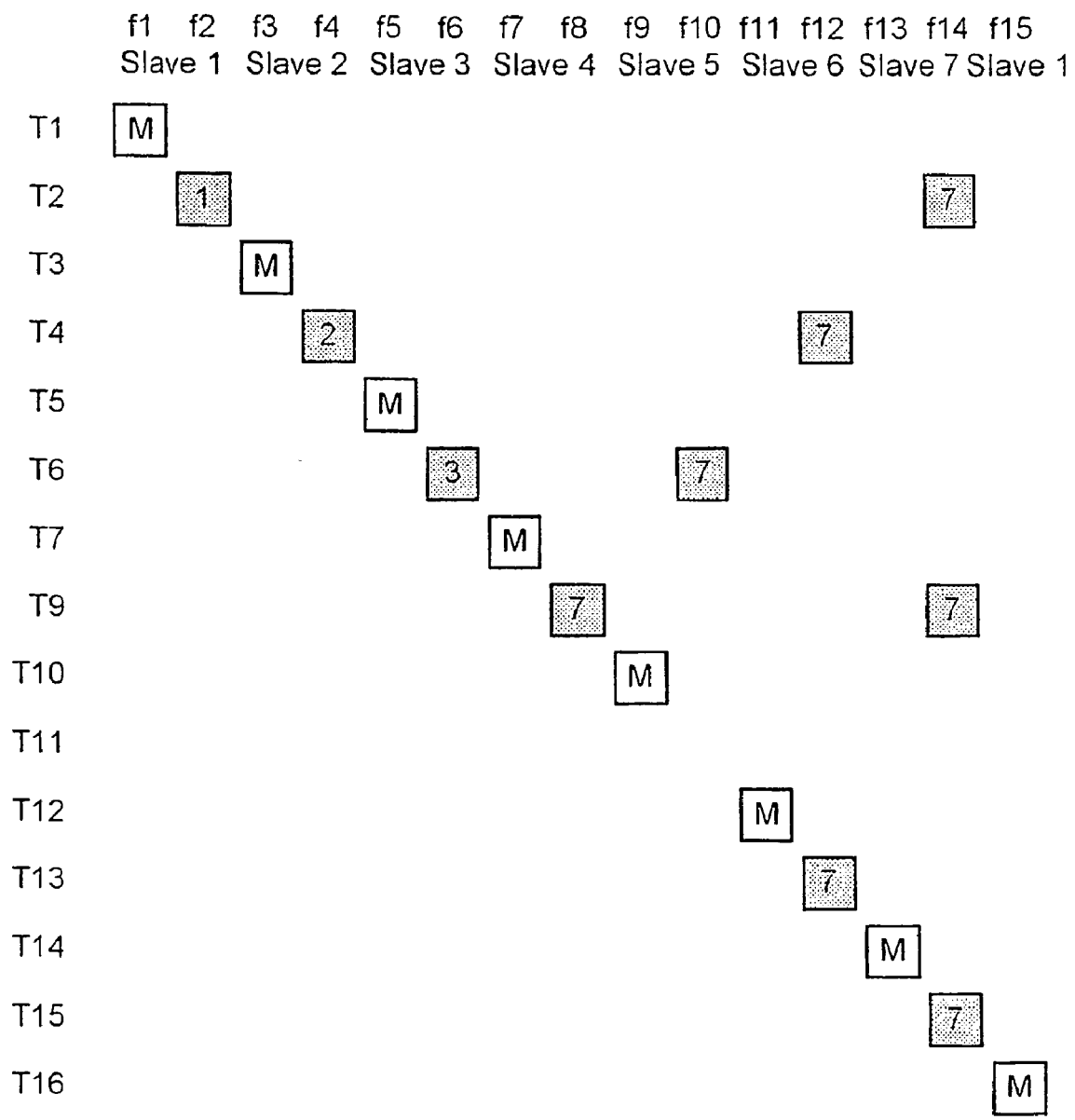

In an alternative system, slaves that have forwarded data transmit that data to the master in preference to any own data that they may subsequently receive in the same round if that data is not sent to the master by a preceding slave. This "restrictive algorithm" can afford further performance improvements, and is illustrated in FIG. 6. In FIG. 6, once slave 5 has forwarded the first chunk to slave 4 it is committed to sending that chunk to the master if slave 4 fails to do so. Therefore, when slave 7 receives slave 5's transmission forwarding the chunk to slave 4 it knows that the chunk will be transmitted to the master no later than slave 5's uplink transmission slot. Therefore, slave 7 can forward the second packet to slave 6 straight away. This can provide significant advantages in implementations where there are large numbers of intermittently operating slaves.

The slaves need not be restricted to transmitting only after being addressed by the master. In an alternative scheme, the slaves could be allotted predetermined slots in turn, and with the slaves suitably synchronised (e.g. by clocks or by listening to the transmissions of the other slaves) each slave could transmit to the master only during its predetermined slot.

The present invention is particularly, but not exclusively, applicable to wireless, and especially radio, networks. The present invention can be used with, but is not restricted to, protocols such as Bluetooth and derivatives thereof. The present invention is especially applicable to systems in which there is wireless communication between the master and the slaves. However, this is not essential. One example of a wireless protocol to which the present invention could be applied is Bluetooth. The one or more of the slaves and/or the master could be mobile.

In one convenient embodiment, the master could provide the slaves with a connection to a local area network and/or to the internet.

Instead of being applied to master/slave systems, the present invention could be applied to peered systems, where the unit analogous to the one referred to herein as the master is at the same hierarchical level as the slaves.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method, comprising:
    transmitting data in a data transmission system comprising a first node and a plurality of second nodes;
    addressing, by the first node, the second nodes in a predetermined order;
    transmitting, by each second node, data directly to the first node immediately after having been addressed by the first node; and
    when a second node has data to transmit to the first node and another second node in the order did not transmit data to the first node in its previous opportunity to transmit data directly to the first node, forwarding at least some of the data from the second node to the another second node for transmission to the first node via the another second node.

2. The method as claimed in claim 1, further comprising:
    when a second node has data of its own to transmit to the first node, the second node transmitting the data of its own in preference to transmitting to the first node data that it has received from another second node.

3. The method as claimed in claim 1, further comprising:
    when a second node has forwarded its own data to another second node for transmission to the first node, monitoring, by the second node, transmissions to the first node to determine whether that data is transmitted to the first node.

4. The method as claimed in claim 1, further comprising:
    when a second node has forwarded data to another second node for transmission to the first node, monitoring, by the second node, transmissions to the first node to determine whether that data is transmitted to the first node.

5. The method as claimed in claim 3, further comprising:
    when the data has not been transmitted to the first node before the second node next has an opportunity to transmit data to the first node, transmitting, by the second node, the data to the first node.

6. The method as claimed in claim 1, further comprising:
    transmitting, by each second node, a single packet of data to the first node immediately after having been addressed by the first node.

7. The method as claimed in claim 5, wherein the transmitting the data comprises transmitting each packet of data with an identification of the node that transmitted the packet.

8. The method as claimed in claim 5, wherein the transmitting the data comprises transmitting each packet of data with an identification of the node to which the packet is transmitted.

9. The method as claimed in claim 1, further comprising:
    operating the first and second nodes according to a Bluetooth protocol.

10. The method as claimed in claim 1, further comprising:
    the first and second node communicating with each other wirelessly.

11. A first node, comprising:
    a transmission unit configured to transmit data in a data transmission system, the data transmission system comprising a plurality of first nodes and a second node, the second node being configured to address the first nodes in a predetermined order,
    wherein the first node is configured to transmit data directly to the second node immediately after having been addressed by the second node, and
    wherein, when the first node has data to transmit to the second node and another first node in the order did not transmit data to the second node at its previous opportunity to transmit data directly to the second node, the first node is configured to forward at least some of the data to the another first node for transmission to the second node via the another first node.

12. A first node, comprising:
    means for transmitting data in a data transmission system, the data transmission system comprising a plurality of first nodes and a second node, the second node comprising means for addressing the first nodes in a predetermined order;
    means for transmitting data directly to the second node immediately after having been addressed by the second node; and
    means for, when the first node has data to transmit to the second node and another first node in the order did not transmit data to the second node at its previous opportunity to transmit data directly to the second node, forwarding at least some of the data to the another first node for transmission to the second node via the another first node.

13. A method, comprising:
- identifying that a first node, of a plurality of first nodes in a data transmission system that are configured to communicate in order directly with a second node in the data transmission system, has data to transmit to a second node; and
- identifying that another first node of the plurality of first nodes in the order did not transmit data to the second node at its previous opportunity to transmit data directly to the second node; and
- forwarding at least some of the data to the another first node for transmission to the second node via the another first node.

* * * * *